United States Patent [19]
Jalili

[11] Patent Number: 6,088,683
[45] Date of Patent: Jul. 11, 2000

[54] SECURE PURCHASE TRANSACTION METHOD USING TELEPHONE NUMBER

[76] Inventor: Reza Jalili, 32 W. 40th St., Apt. 9C, New York, N.Y. 10018

[21] Appl. No.: 08/700,861

[22] Filed: Aug. 21, 1996

[51] Int. Cl.[7] .......................... H04M 17/00; H04M 11/00
[52] U.S. Cl. .................. 705/26; 705/24; 705/27; 705/37; 705/44; 709/246; 379/91.2; 379/93.23
[58] Field of Search .................. 705/26, 39, 44, 705/24, 27, 37; 380/24

[56] References Cited

U.S. PATENT DOCUMENTS

| | | | |
|---|---|---|---|
| 4,823,264 | 4/1989 | Deming | 705/39 |
| 5,267,149 | 11/1993 | Anada et al. | 705/44 |
| 5,329,589 | 7/1994 | Fraser et al. | 379/91.2 |
| 5,475,585 | 12/1995 | Bush | 705/26 |
| 5,479,510 | 12/1995 | Olsen | 705/17 |
| 5,485,510 | 1/1996 | Colbert | 379/145 |
| 5,677,955 | 10/1997 | Doggert et al. | 705/44 |
| 5,692,132 | 11/1997 | Hogan | 705/27 |
| 5,715,314 | 2/1998 | Payne et al. | 705/26 |
| 5,715,397 | 2/1998 | Ogawa et al. | 709/246 |
| 5,717,989 | 2/1998 | Tozzoli et al. | 705/37 |
| 5,724,412 | 3/1998 | Srinivasan | 379/93.23 |
| 5,724,424 | 3/1998 | Gifford | 705/26 |
| 5,727,163 | 3/1998 | Bezos | 705/27 |
| 5,757,917 | 5/1998 | Rose et al. | |
| 5,825,881 | 10/1998 | Colvin, Sr. | 380/24 |
| 5,890,137 | 3/1999 | Koreeda | 705/26 |

FOREIGN PATENT DOCUMENTS

| | | |
|---|---|---|
| 813325 | 12/1997 | European Pat. Off. . |
| WO 96/34471 | 10/1996 | WIPO . |

OTHER PUBLICATIONS

Rodriguez, Karen, "CyberSource Sells Software on Internet", Infoworld, vol. 16, No. 47 (Nov. 21, 1994), p. 53.

"Checkfree Corp. Announces Agreements with Sharp, Spry and a Host of Internet Access Providers; Checkfree Serves as the Leader of Interactive Financial Services for the Internet", Business Wire, (Dec. 6, 1994), 2 pp.

Gelormine, Vince, "Selling in Cyberspace", Success, vol. 42, No. 4 (May 1995), pp. 61–68.

"AT&T and Spanlink Communications to Provide Telephone Links From the Internet for Secure Electronic Commerce", Business Wire, (Dec. 4, 1995), 2 pp.

Messmer, Ellen, "ActiveX Pioneer Pushes Commerce", Network World, (May 6, 1996), p. 33.

"Offers 'Transparent' Front End—Commerce Direct Foils Web Piracy", Computer Reseller News, (Jun. 24, 1996), p. 55.

Selected hard–copy pages of Amazon.com's website, (Mar. 10, 1998), 8 pp (including company info indicating Jul., 1995 as Amazon.com's internet's publication date & internet off–line ordering by telephone).

Http://www.firstvirtual.com.

*Primary Examiner*—Eric W. Stamber
*Assistant Examiner*—Jagdish Patel
*Attorney, Agent, or Firm*—Ostrolenk, Faber, Gerb & Soffen

[57] ABSTRACT

A method of completing a purchase utilizing a first network and a second network, the method being applicable for example to a case in which the second network (which may be the public telephone system) is considered by knowledgeable people to be more secure than the first network (which may be the Internet). The method comprises the steps of (a) registering over the second network a customer's financial information in a central processing center; (b) ordering over the first network a good or service that the customer desires to purchase from a merchant; (c) supplying identifying information to the merchant pertaining to the customer; (d) supplying information from the merchant to the processing center pertaining to the purchase; (e) establishing a contact between the customer and the processing center in which the customer is identified to the processing center and the customer expresses intent to complete the purchase; and (f) debiting an account of the customer and crediting an account of the merchant in order to complete the purchase.

20 Claims, 1 Drawing Sheet

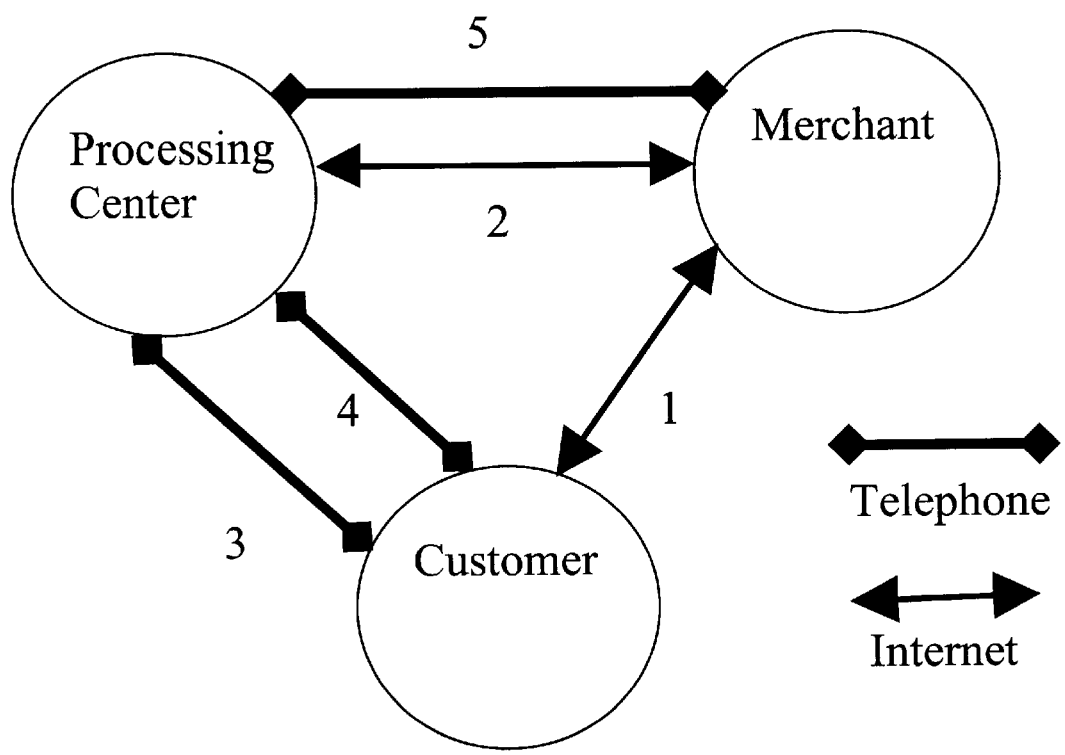

SECURE PURCHASE TRANSACTION METHOD USING TELEPHONE NUMBER

FIELD OF INVENTION

The present invention relates to a method of conducting financial transactions over the Internet, including the World-Wide Web.

BACKGROUND OF THE INVENTION

Increasingly, merchants are selling goods and services on the World-Wide Web (WWW). However, although the Web is ideal for browsing, online transactions are not secure over a public network. Even with the available encryption systems, customers are wary of transmitting their credit card numbers, since the credit card information will be passed from node to node and therefore will be subject to interception at multiple points. There is a need for transactions to be made more safely and conveniently using the Internet.

SUMMARY OF THE INVENTION

The invention relates to a method for carrying out a commercial transaction using a public network in combination with a secure dial-up network, such as the public telephone system. Two media are used in combination, namely the Internet, which is not considered by knowledgeable persons to be adequately secure, and the public telephone system, which can be used with relatively greater security by the use of the CallerID function, a PIN number, and/or other identifying data. Unlike the Internet, the telephone system permits identification of the source of a call, is reliable and familiar, and permits access to technology such as automated voice response systems.

A first advantage of the invention is that a third party, namely a transaction processing center, is utilized for the financial processing of the transaction, whereby all need for a merchant to have the customer's credit card information may be eliminated.

According to a second advantage of the invention, if it is desired for a merchant to receive the credit card information, that information can be transmitted directly to the merchant from a central office, over a single link, which is more secure than the information being transferred between multiple nodes over the Internet.

Other features and advantages of the present invention will become apparent from the following description of several embodiments of the invention which refers to the accompanying drawings.

BRIEF DESCRIPTION OF THE DRAWINGS

The single FIGURE is a schematic diagram illustrating the steps in a method according to several embodiments of the invention.

DETAILED DESCRIPTION OF EMBODIMENTS OF THE INVENTION

Three embodiments of the invention are disclosed herein. The disclosed embodiments have in common an initial registration step, in which a customer registers one or more credit-cards with a central office, which will be referred to herein as the processing center. The registration can be made over the telephone or by a written application, and therefore is secure. It includes a preferred shipping address such as the customer's home. In the registration process, the processing center can verify the source of the registration information by the use of the telephone system's CallerID function. An alternate telephone number can be accepted if the customer is not calling from the number that is desired to be registered. In that case, or if desired for any other reason, a human operator at the processing center can call back the registrant and/or request additional identification information before accepting the registration information.

The registration information may include a name to be used for identification (not necessarily the name on the credit cards), credit card information, telephone number, shipping address, optional PIN, preferred approval method, self-imposed credit limit, e-mail address, alternate name used by the customer, statement mailing address, or credit-card preference list.

When shopping, the customer browses for goods and services using a public network (the Internet or World-Wide Web). The FIGURE shows schematically the steps involved in a transaction according to a first embodiment of the invention. In step 1, the customer selects the goods or services to be purchased from a merchant and identifies himself by providing registered name and telephone number to the merchant. The merchant generates a purchase number associated with the customer's selections. The customer optionally may give additional information such as an alternate shipping address, a method of credit approval, or an invoice expiration time different from that supplied by the merchant or by the processing center.

In step 2, the merchant then delivers a purchase number together with a merchant number to the processing center, by E-mail, phone, or another means, for example on an invoice addressed to the processing center. The invoice may have a stated lifetime which may be supplied by the merchant or by the customer's information registered with the processing center. The invoice may include the buyer's registered name (not necessarily his real name), a telephone number, the merchant's name and identification number, a list of items being purchased together with the price of each, a total price, an expiration time, or optional attachments for the merchant's use.

In step 3, to complete the sale, the customer accesses the processing center using a touch-tone phone or a modem. The customer is identified by the telephone system's CallerID function plus a personal identification number (PIN) and/or other registered information for extra security. If the customer's telephone number on file with the processing center does not match the telephone number detected by CallerID, an operator will ask the customer for further identifying information.

In step 4, upon recognizing the customer, the processing center lists all outstanding invoices and gives the customer the opportunity to make a selection and thereby express intent to complete the sale. The customer interacts with the processing center by some means, for example, using a telephone hand set or a computer with a modem. The processing center logs the customer's selections and sends an E-mail message to the customer to confirm the invoices and payments that the customer has approved. When the mode of interaction is voice, a processing center representative will handle the transaction through human conversation. When the mode of interaction is through a voice response unit, the buyer will use the telephone keypad to respond to the choices presented by the system. The choices will allow the buyer to select the invoice(s) to be paid or cancelled, and the credit card(s) to be used. When the mode of interaction is through a programmed computer using a modem, the decisions are entered using the keyboard and/or mouse.

Then, in step 5, the processing center debits the customer's preregistered credit-card and credits the merchant over a standard private credit-card transaction system. The processing center also sends an acknowledgment of the acceptance of the sale and of the credit to the merchant by phone, E-mail, or another means.

A second embodiment differs from the first embodiment in that in step 3, the processing center can itself initiate confirmation of the sale by sending an E-mail message or placing a telephone call to the customer upon receipt of the sale information or invoice from the merchant. An advantage of this embodiment is that it more securely confirms the identity of the customer and the fact that the sale is authorized. It also reminds the customer that the sale is pending and encourages the customer to complete the sale.

The customer can be given control over whether it is the customer or the processing center who makes the telephone or modem contact in step 3 to complete the sale. The party who will make the contact can be specified either on the processing center application, for all sales, or on the merchant's form for a given sale.

In step 5, in a third embodiment of the invention, the processing center can deliver the customer's credit card information securely to the merchant upon receipt of the customer's approval of the sale. As an additional security precaution, the processing center can confirm to the customer by E-mail or another channel that the customer's information has been sent to the merchant. An advantage of this embodiment is that the processing center is not required to have access to the conventional banking channels.

Although the present invention has been described in relation to particular embodiments thereof, many other variations and modifications and other uses will become apparent to those skilled in the art. Therefore, the present invention is not limited by the specific disclosure herein.

What is claimed is:

1. A method of completing a purchase utilizing a first electronic network and a second electronic network; comprising the steps of:
   (a) registering over the second electronic network a customer's financial information in a central processing center;
   (b) ordering over the first electronic network a good or service that the customer desires to purchase from a merchant;
   (c) supplying identifying information to the merchant pertaining to the customer;
   (d) supplying information from the merchant to the processing center pertaining to the purchase;
   (e) establishing, over the second electronic network a contact between the customer and the processing center in which the customer is identified to the processing center and the customer is enabled to express intent to complete the purchase; and
   (f) debiting an account of the customer and crediting an account of the merchant using electronic means in order to complete the purchase.

2. A method as in claim 1, further comprising the step of the processing center verifying the source of the customer's financial information.

3. A method as in claim 2, wherein the second network is the public telephone system, said identifying information of step (c) includes a telephone number, and the verifying step is carried out using the CallerID system.

4. A method as in claim 3, wherein the financial information registered in the processing center includes an alternate telephone number and the verifying step is carried out by telephoning the alternate telephone number.

5. A method as in claim 3, wherein said information supplied in step (d) includes an invoice, and said identifying information pertaining to the customer in step (c) includes a predetermined invoice lifetime selected by the customer.

6. A method as in claim 5, wherein said information supplied in step (d) includes an invoice, and said information pertaining to the purchase in step (d) includes a predetermined invoice lifetime selected by the merchant.

7. A method as in claim 3, wherein said information supplied in step (d) includes an invoice, and said information pertaining to the purchase in step (d) includes a predetermined invoice lifetime selected by the merchant.

8. A method as in claim 3, wherein said step (e) is carried out over the second network and the customer is identified to the processing center using the CallerID system.

9. A method as in claim 3, further comprising the step of confirming to the customer and to the merchant over the first network that the purchase has been completed.

10. A method as in claim 3, wherein said step (e) further comprises the step of the processing center displaying a plurality of orders that the customer has made and permitting the customer to select from among those orders.

11. A method as in claim 3, wherein said step (f) includes the steps of the processing center supplying the customer's financial information over the second electronic network, and the merchant completing the purchase by electronically debiting an account of the customer and crediting an account of the merchant.

12. A method as in claim 3, further comprising the step of the processing center confirming to the customer using said first electronic network that the financial information has been supplied to the merchant.

13. A method as in claim 3, wherein said step (f) includes the step of the processing center completing the purchase electronically debiting an account of the customer and crediting an account of the merchant.

14. A method as in claim 3, wherein said step (e) is initiated by the customer.

15. A method as in claim 3, wherein said step (e) is initiated by the processing center.

16. A method of operation of a processing center for carrying out an electronic financial transaction utilizing a first electronic network and a second electronic network, comprising the steps of:
   receiving a customer's financial information in said processing center using the second electronic network;
   verifying the source of the customer's financial information;
   receiving information in said processing center pertaining to a good or service selected over the first electronic network that the customer desires to purchase from a merchant; and
   establishing contact between the customer and the processing center by a telephone number in which the customer is identified to the processing center and the customer is enabled to express intent to complete the purchase.

17. A method as in claim 16, wherein the second network is the public telephone system and the identifying step is carried out using the CallerID system.

18. A method as in claim 17, wherein the financial information registered in the processing center includes an alternate telephone number and the verifying step is carried out by telephoning the alternate telephone number.

19. A method as in claim 17, wherein contact is established over the second network and the customer is identified to the processing center using the CallerID system.

20. A method as in claim 17, wherein establishing contact further comprises the step of the processing center displaying a plurality of orders that the customer has made and permitting the customer to select from among those orders by electronic means.

* * * * *